United States Patent [19]

Croft et al.

[11] Patent Number: 4,946,223
[45] Date of Patent: Aug. 7, 1990

[54] REDUNDANT SEAT LOCKING MECHANISM

[76] Inventors: George Croft, 3178 Windwood Dr., Mississauga, Ontario, Canada, L5N 2J9; Gulam Premji, 4503 Kimbermount Ave., Mississauga, Ontario, Canada, L5M 4J4

[21] Appl. No.: 409,559

[22] Filed: Sep. 15, 1989

[51] Int. Cl.⁵ .............................................. A47C 1/026
[52] U.S. Cl. ..................................... 297/367; 297/362
[58] Field of Search ............... 297/367, 366, 369, 361, 297/362; 74/529, 530; 16/343, 344

[56] References Cited

U.S. PATENT DOCUMENTS

| | | | |
|---|---|---|---|
| 3,901,100 | 8/1975 | Iida et al. ........................ | 297/367 X |
| 4,401,344 | 8/1983 | Chihara et al. ................... | 297/367 |
| 4,406,497 | 9/1983 | Kluting ............................. | 297/366 |
| 4,591,207 | 5/1986 | Nithammer et al. .............. | 297/367 X |
| 4,685,736 | 8/1987 | Tanaka et al. .................... | 297/367 X |
| 4,687,252 | 8/1987 | Bell et al. ......................... | 297/367 X |
| 4,795,213 | 1/1989 | Bell .................................... | 297/367 |
| 4,836,608 | 6/1989 | Sugiyama .......................... | 297/367 |

FOREIGN PATENT DOCUMENTS 3027629  2/1982  Fed. Rep. of Germany ...... 297/367

Primary Examiner—Jose V. Chen
Attorney, Agent, or Firm—Patrick J. Hofbauer

[57] ABSTRACT

In a vehicle seat assembly having a backrest member pivotally movable with respect to a seat member, there is disclosed a device for controlled adjustment of the inclination of the backrest member with respect to the seat member, which device includes a redundant locking mechanism which is activated upon failure of the primary locking mechanism so as to prevent uncontrolled rearward pivoting of the backrest member over the seat member. Moreover, the activation of the secondary locking structure is signalled to the seat occupant by a change in the operation of the device, which change in operation prevents the seat occupant from attempting to re-adjust the inclination of the backrest member without servicing of the device by qualified personnel.

5 Claims, 3 Drawing Sheets

REDUNDANT SEAT LOCKING MECHANISM

This invention relates to improvements in backrest inclination adjustment devices such as are employed, for example, in vehicle seat assemblies.

The prior art is exemplified by U.S. Pat. No. 4,687,252, issued to Robert L. Bell, et al, on Aug. 18, 1987, which patent discloses the use of a recliner mechanism for a vehicle seatback, which mechanism includes a coil spring clutch which is selectively tightened or loosened around an actuator clutch drum surface to adjustably fix the reclined position of a vehicle seatback. The coil spring clutch is controlled by an actuator lever which selectively causes the coil clutch spring to tighten or loosen around the actuator clutch drum. More importantly, in relation to the present invention, a redundant positioning pawl is provided which redundant pawl prevents unrestrained motion of the seatback member in the event of failure of the coil spring clutch. The actuator lever is normally biased by a spring means to an engaged position whereat the coil spring clutch is tightened around the clutch drive surface and whereat the redundant positioning pawl directly interferes with a structural member of the vehicle seatback, so as to restrain forward or rearward reclining of the seatback. A pivotally mounted intermediate lever is interconnected between the actuator lever and the redundant positioning pawl so as to cause movement of the redundant positioning pawl out of such interference when the actuator lever is moved from the engaged position to a disengaged position, thereby allowing for pivotal movement of the backrest member over the seatrest member. Once a selected backrest inclination angle is selected, the actuator lever is released, whereby the released, whereby the aforementioned spring biasing means returns actuator lever to the engaged position, with consequential locking of the seatback member as aforesaid. The redundant positioning pawl is also spring biased towards interference with a structural member of the seatback member, and, upon failure or improper operation of the coil spring clutch actuator, such biasing serves to move the redundant positioning pawl into locking interference with said structural member, thereby preventing sudden reclining of the seat back under the weight of an occupant, with possible disastrous consequences.

While redundant reclining devices such as the Bell device constitute a significant improvement over similar devices not having a redundant locking feature, they nonetheless, have serious safety shortcomings. Foremost among these is the fact that the redundant locking mechanism may, upon failure of the primary locking means, be accidentally moved by the seat occupant to a disengaged mode, thus causing sudden and unexpected rearward tilting of the backrest member. As will be appreciated, this could be particularly disastrous where the seat in question is occupied by the vehicle driver. Additionally, it should be considered that in prior art devices such as Bell there may be no indication to the seat occupant that the primary device has failed. That is, such prior art devices may continue to operate in what appears to the occupant to be a normal manner, as the seat occupant is able with such devices to release the actuator lever from the engaged position and, re-adjust the inclination angle of the backrest member, thereafter returning the lever to the engaged position. In so doing he may not appreciate any difference in the operation of the locking mechanism. The operator may thus continue to use the vehicle seat in a potentially dangerous condition in which it was not designed to be used. Even where the seat occupant realizes there is a problem in the operation of the mechanism, there is a tendency to put off servicing of the device to a more convenient time.

Moreover, some prior art redundant locking devices are constructed so that the redundant locking mechanism can, after failure of the primary locking mechanism, be accidentally disengaged by inadvertent movement of the actuator lever, with subsequent uncontrolled reclining of the backrest.

So it will be seen that all prior art inclination adjustment devices, even those incorporating a redundant locking feature, encourage continued usage under potentially dangerous conditions.

It is an object of the present invention to provide a device for controlled adjustment of the inclination of a backrest of a vehicle seat assembly which device incorporates a redundant safety locking feature and which device is both simple to manufacture and to install.

It is a further object of the present invention to provide an inclination adjustment device having a redundant safety locking means which device gives notice to the seat occupant of the failure of the primary locking means through a significant change in the mode of operation of the device.

It is yet a further object of this invention to provide an improved inclination adjustment device in which the redundant safety locking means cannot be unintentionally disengaged following failure of the primary locking means, so as to prevent sudden and unexpected rearward inclining of the backrest member of an occupied vehicle seat.

It is yet a further object of the present invention to provide an improved inclination adjustment device which, following failure of the primary locking means, must be restored to its full operating condition by servicing personnel before unlocking of backrest member, either intentionally or accidentally, is possible.

These and other objects of the present invention will become more apparent once the following description of a preferred embodiment, described by way of example only, is read with reference to the accompanying drawings.

Figures 1, 2:
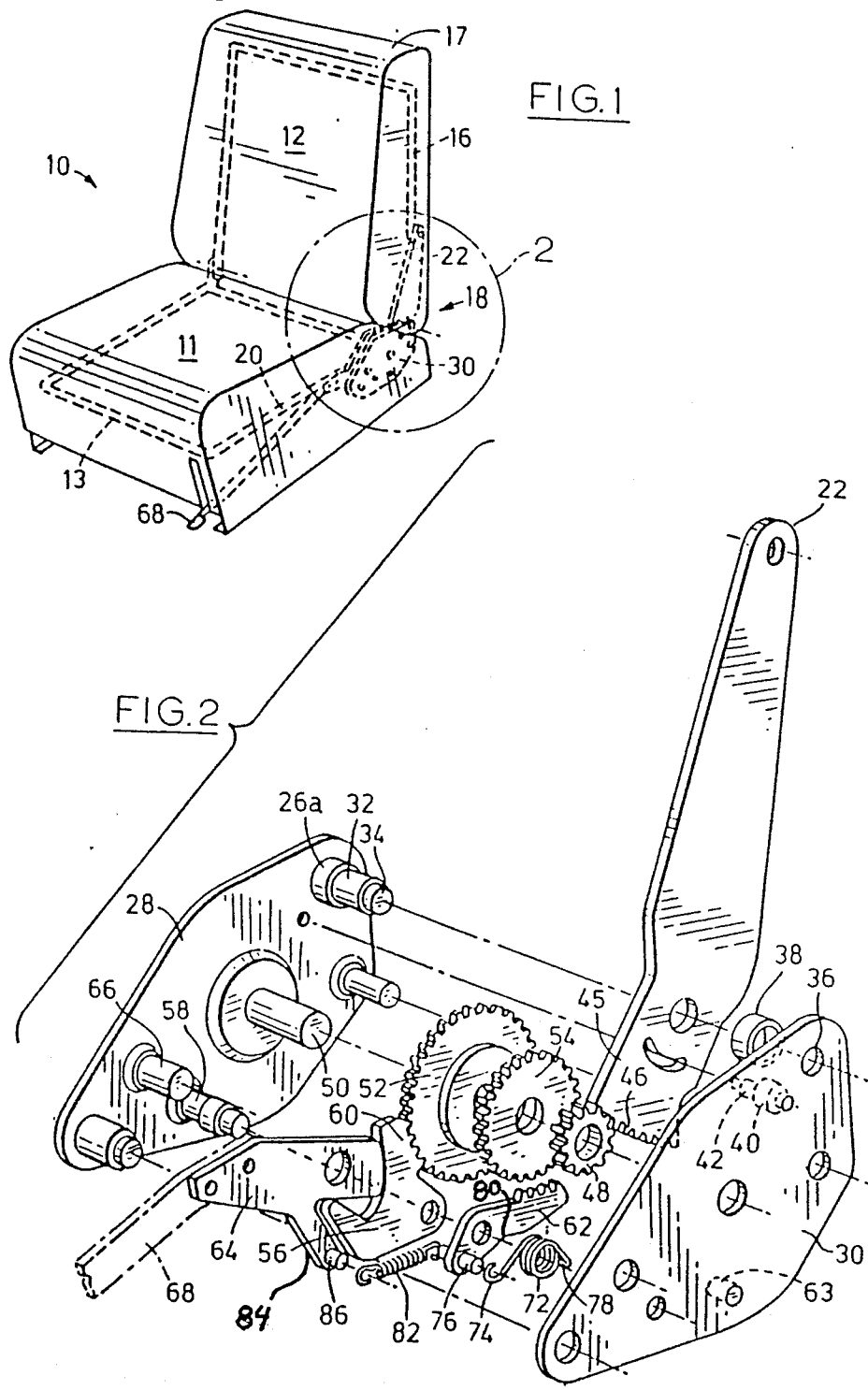
FIG. 1 is a diagrammatic perspective view of a vehicle seat assembly having an inclination adjustment device in accordance with the present invention incorporated therein, the backrest member being shown in the normal upright position.
FIG. 2 is an exploded view of the inclination adjustment device of FIG. 1.

FIG. 1 shows a typical vehicle seat assembly 10 of the general type with which the invention may be used. Such a seat assembly may be of the "bucket" type as illustrated, or may be of the well-known multi-occupant "bench" type. In the latter case, it is preferable to use one inclination adjustment device according to the invention at each of the two sides of the "bench" type seat assembly. With "bucket" type seat assemblies, it is generally sufficient to use a single adjustment mechanism for each seat assembly installed, as for example, in the circled area 2 of FIG. 1, and the preferred embodiment will be described with reference to such use, although it will be expressly understood by those skilled in the art that specific vehicle seat applications may call for the analagous use of two or more inclination adjustment devices according to the invention with each vehicle seating assembly.

Vehicle seat assembly 10 of FIG. 1 has a backrest member 12 which is pivotally mounted with respect to a seat member 11. Seat member 11 comprises a seat support frame 13 which is anchored by conventional means in a fore-aft adjustment mode to the floor panels (not shown) of the vehicle and which is covered in the usual manner with upholstery materials 15. The backrest member 12 comprises a support frame 16 which is also covered in the usual manner with upholstery materials 17.

The inclination adjustment device 18 of the invention comprises a first hinge bracket (comprising an inner 28 and an outer 30 hinge plate) which bracket is rigidly connected by any known fastening means (not shown) to a free end 20 of the seat support frame 13. A second hinge bracket 22 is provided with an upper terminal aperture 24 dimensioned to receive a nut and bolt (not shown) to rigidly secure the second hinge bracket 22 to the support frame 16 of the backrest member 12. Other conventional fastening means, such as rivets or spot welding, may be used with equal facility. Alternatively, the second hinge bracket 22 may be integrally formed as a terminal portion of the support frame 16.

The first hinge bracket comprises the inner hinge plate 28 and the outer hinge plate 30, which plates are substantially congruent and arranged substantially parallel to one another. It will be seen from FIG. 2 that the inner 28 and outer 30 hinge plates are maintained at a defined operative distance from one another by means of various shouldered rivets and spacing washers as more fully described below.

The second hinge bracket 22 is pivotally mounted about a pivot pin 26 between the inner 28 and outer 30 hinge plates so as to be pivotally movable with respect to the first hinge bracket 19 so as to allow for tilting of the backrest member 12 over the seat member 11. As best seen in FIG. 2, the inner hinge plate 28 is provided with a shouldered main hinge pin 26 of which the second hinge bracket 22 is pivotally mounted by means of aperture 31 about a central portion 32 of the hinge pin 26 for pivotal movement of the seat back as previously mentioned. A reduced diameter end portion 34 of the hinge pin 26 rests in the fully assembled condition in an aligned aperture 36 of the outer hinge plate 30, with the shoulder portion 26a and the spacer element 38 serving to maintain operative clearances between the second hinge bracket 22 and the inner 28 and outer 30 hinge plates of the first hinge bracket. The shoulder 26a, could, instead of the integral shoulder shown, take the form of a second spacer element.

The rotational angle through which the second hinge bracket 22 may pivot in the rearward (reclining) direction is limited by a shouldered guide pin 40 which has an intermediate diametered portion 42 which portion slides within a control slot 44 formed in the second hinge bracket 22. In this manner, the control slot 44 defines the operative range of inclination of the backrest member 12. That is, when the backrest member 12 is in its fully reclined position, further reclining pivotable movement is prevented by contact of the intermediate diametered, portion 42 of the shouldered guide pin 40 with the trailing end 41 of the control slot 44. The rotational angle through which the second hinge bracket 22 may pivot in the forward (inclining) direction is limited by contact of the intermediate diametered portion 42 of the shouldered guide pin 40 with the leading end 43 of the control slot 44.

The second hinge bracket 22 is formed adjacent its terminal end 45 with a gear sector means 46, which gear sector means interacts with a pinion 48 in the following manner. The pinion 48 (which comprises a "gear means" as used in the claims) is mounted on the first hinge bracket by means of an axle pin 50 in meshing engagement with the gear sector means 46 so as to rotate around the pin 50 on pivotal movement of the second hinge bracket 22 about the main hinge pin 26. A first 52 and a second 54 locking gears are similarly mounted on the axle pin 50 for rotation therearound. The second locking gear 54 is of smaller diameter than the first locking gear 52 and both are affixed to the pinion 48 in concentric relation therewith. Any conventional affixation means may be used, such as radial keying, spot welding, etc, it being understood that the pinion 48 and the first 52 and second 54 locking gears rotate together as a unitary structure upon driving rotation by the gear sector means 46.

The first locking pawl 56 is pivotally mounted between the inner 28 and outer 30 hinge plates of the first hinge bracket by means of an axle pin 58 so as to be freely rotatable there-about, between a first position in which the first locking pawl 56 restrainingly engages the first locking gear 52 by means of a toothed head portion 60 of the first locking pawl 56 (this position being shown in FIGS. 2 and 3) and a second position in which the first locking pawl 56 is removed from such restraining engagement (see FIG. 4) so as to allow for free pivotal movement of the backrest member 17. It will be appreciated that in the first position illustrated in FIGS. 2 and 3, the backrest member 17 is held against pivotal movement in either the fore or aft directions and that, when the first latching pawl 56 is in its second position as shown in FIG. 4, the backrest member 17 is free to be moved piviotally in either the fore or aft directions to the extent allowed by the shouldered guide pin 40 interacting with the central slot 44.

A second locking pawl 62 is pivotally mounted on the first hinge bracket by means of the pivot pin 58 on which the first locking pawl 56 is also mounted. In this manner, the second locking pawl 62 is able to pivotally move, under conditions described more fully below, between a first position (not shown) in which it restrainingly engages the second locking gear 54 and a second position (indicated in all of the Figures) in which it is removed from such restraining engagement with the second locking gear 54, and bears upon a stop pin 63 protruding from the outer hinge plate 30.

A handle means 64 is pivotally mounted on the first hinge bracket by means of a pivot pin 66 spanning the space between the inner 28 and outer 30 hinge plates of the first hinge bracket 19. The handle means 64 has a handle extension member 68 which extends towards the front edge of the seat member 11 to facilitate gripping by an occupant of the seat assembly 10. The handle means 64 is pivotaly moveable about the pivot pin 66 between a first position (illustrated in FIGS. 2 and 3) in which a cam portion 70 of the handle means 64 bears upon the head portion 60 of the first locking pawl 56 so as to urge the first locking pawl into the aforementioned first position of the locking position and a second position (illustrated in FIG. 4) in which the cam portion 70 bears upon a tail portion 73 of the first locking pawl 56 so as to urge the first locking pawl into its second position, at which second position the head portion 60 is disengaged from the first locking gear 52.

A first spring means in the form of a coil spring 72 is mounted about the axle pin 58 so as to be adapted to bias the second locking pawl 62 towards the said first position thereof when not prevented from doing so by the further mechanism described below. The coil spring 72 has a first hooked end portion 74 which engages a pin 76 protruding from the second locking pawl 62 and a second hooked end portion 78 which engages a notch 80 formed in the underside of the second locking pawl 62 so as to provide for said biasing.

Figure 3:
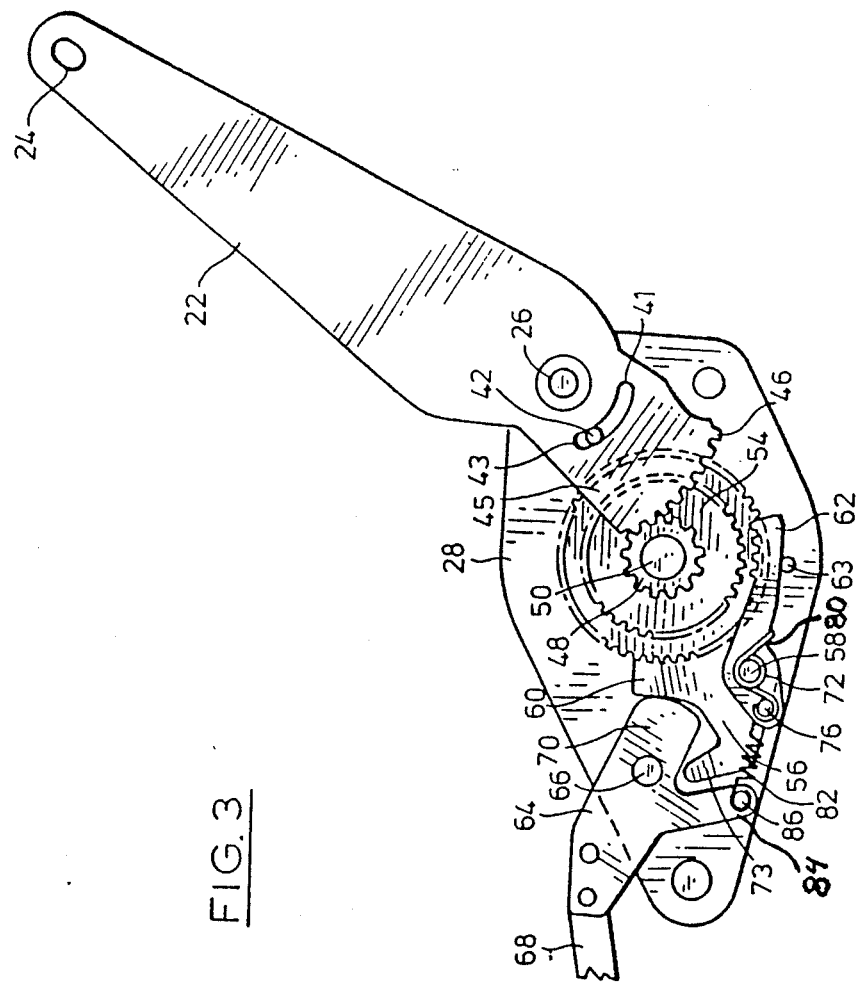
FIG. 3 is a side sectional view of the device of FIG. 2, with the locking mechanism thereof in an engaged configuration; and, FIG. 4 is a view similar to FIG. 3, with the locking mechanism in a disengaged configuration so as to allow pivotal movement of the seat back.
Figure 4:
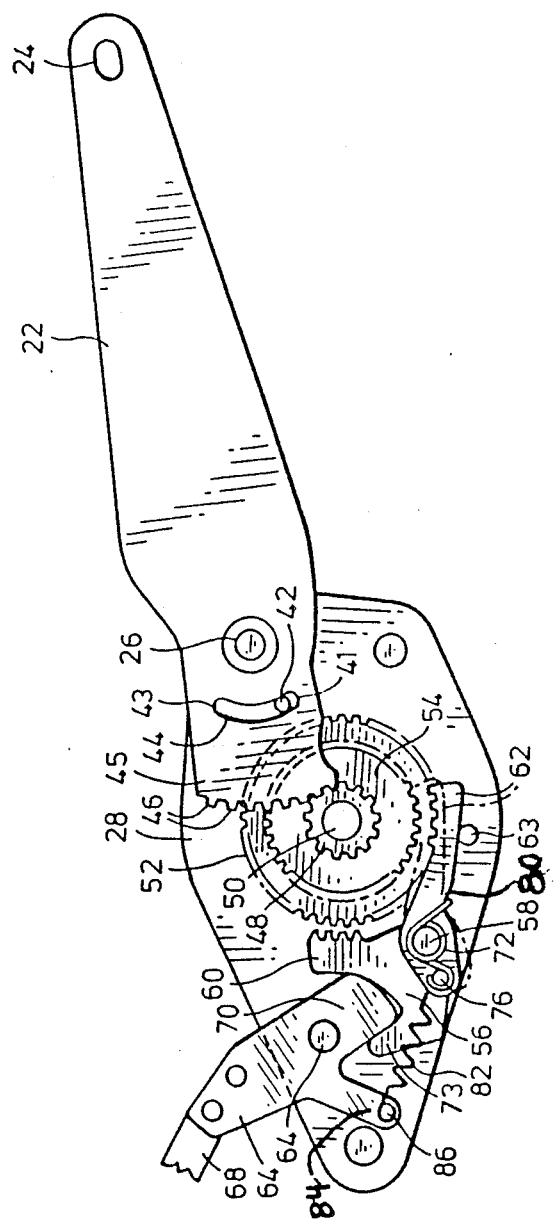

A second spring means in the form of a coil spring 82 is interconnected between an arm portion 84 of the handle means 64 and the near side of the second locking pawl 62 so as to normally bias the handle means 64 to the first position as shown in FIGS. 2 and 3. Spring 82 is connected to the arm portion 84 by means of a pin 86 affixed to the arm portion 84, and to the second locking pawl 62 by means of the pin 76. It will be appreciated that the second spring 82 is of greater biasing strength than the first spring means 72 so that it is able to overcome the biasing of the first spring means 72 so as to bias the second locking pawl 62 to its respective second position. The second spring means 82 must be sufficiently strong to overcome the biasing of the first spring means 72 regardless of whether the handle means 64 is in its respective first (see FIG. 3) or second (see FIG. 4) position.

With the above arrangements, it will be appreciated that, when both springs 72 and 82 are fully operative, the seat occupant need only move the handle means 64 from the first position shown in FIG. 3 to its second position as in FIG. 4 to release the first locking pawl 56 from engagement with the first locking gear 52 to effect manual adjustment of the inclination of the backrest member 12. The second locking pawl 62 is at all times during such normal operation of the handle means 64 positioned substantially at its respective second position by reason of the overriding biasing effect of the second spring means 82.

Upon failure of the second spring means 82, the biasing effect on the second locking pawl 62 toward its respective second position is thereby lost, so that it can no longer override the biasing of the first spring means 72. Under such conditions, the second locking pawl 62 is biased by the first spring means 72 to its first position whereat it restrainingly engages the second locking gear 54 so as to hold the backrest member 12 against either fore or aft pivotal movement. It will be appreciated that manipulation of the handle means 64 by the operator, whether accidental or intentional, will have no effect upon the restraining engagement of the backrest member 12 by the second locking pawl 62. As engagement of the second locking gear 54 by the second locking pawl 62 will be substantially instantaneous upon breakage of the second spring means 82, the inclination of the backrest member 12 will not change substantially so that the seat occupant will be largely unaffected, thereby avoiding the potentially dangerous consequences of such failure. Moreover, the seat occupant will not be able to overcome the safety locking by the second locking pawl 62, so that servicing by qualified personnel will be required before the inclination of the backrest member 12 can be altered.

It will be understood that the invention is not to be limited to the exact construction shown and described, but that various changes and modifications may be made without departing from the spirit and scope of the invention as described in the appended claims. For example, a discreet second locking gear 54 need not be provided. Routine design changes in placement and operation of the second locking pawl 62 could be such that the second locking pawl 62 engages the first locking gear 52 upon failure of the first spring means 82. Moreover, the first pawl 56 and second locking pawl 62 need not pivot about the same pivot pin 58. Additionally, the first spring means 72 and the second spring means 82 need not engage a single pin 76 such as shown in the drawings, but could engage separate pins affixed to the second locking pawl 62. The first hinge bracket 19 may be attached to the seat support frame 13 in any one of the numerous well known arrangements currently being used in the art and, indeed, could be made an integral component of the seat support frame 13. Lastly, it is well known in the art to incorporate a separate "dumping" mechanism into the second hinge bracket 22 above the level of the main hinge pin 26. Such dumping mechanism (not shown) may be of the so-called inertial type, in which case the second hinge bracket 22 would itself be of composite construction having an additional upper pivot point (not shown) about which the upper portion of the second hinge bracket 22 would pivot in a manner controlled by the dumping mechanism. Such adaptations are well known in the art and do not add inventive subject matter to the present invention. Additionally, the axle pin 50 could be routinely converted into a drive axle for the pinion 48 and extended to accommodate a rotary handle means for utilization by the seat occupant. This feature would allow the seat occupant to effect adjustment of the backrest member 12 by turning of the rotary handle means, rather than by gripping and pushing the backrest member 17, as is required in the preferred embodiment shown. All of the above modifications to the preferred embodiment shown are mere routine design modifications which do not add inventive subject matter over that claimed.

We claim:

1. In a vehicle seat assembly having a backrest member pivotably moveable with respect to a seat member, a device for controlled adjustment of the inclination of the backrest member with respect to the seat member, said device comprising:
   (a) a first hinge bracket secured to one of said members and a second hinge bracket secured to the other of said members, wherein the one of said first and second hinge brackets which is secured to the backrest member is pivotally moveable with respect to the other of said first and second hinge brackets;
   (b) a gear sector means mounted on said second hinge bracket;
   (c) a gear means mounted on said first hinge bracket in meshing engagement with said gear sector means so as to rotate upon said pivotal movement of the said one of the first and second hinge brackets;
   (d) a first locking gear affixed to the gear means for rotation therewith;

(e) a first locking pawl pivotally mounted on the first hinge bracket for movement between a first position in which the first locking pawl restrainingly engages the first locking gear and a second position in which the locking pawl is removed from said restraining engagement;

(f) a second locking pawl pivotally mounted on the first hinge bracket for movement between a first position in which the second locking pawl restrainingly engages the first locking gear and a second position in which the second locking pawl is removed from said restraining engagement;

(g) a handle means pivotally mounted on the first hinge bracket so as to be moveable between a first position in which a cam portion of the handle means bears upon a head portion of the first locking pawl so as to urge the first locking pawl into its said first position, and a second position in which said cam portion bears upon a tail portion of the first locking pawl so as to urge the first locking pawl into its said second position;

(h) a first spring means mounted on the first hinge bracket so as to be adapted to bias the second locking pawl towards its said first position;

(i) a second spring means of greater strength than said first spring means, interconnected between the handle means and the second locking pawl so as to bias the handle means to said first position of said handle means, while at the same time biasing the second locking pawl to its said second position against said biasing of the first spring means, such that, upon failure of the second spring means, the second locking pawl is biased by the first spring means to its first position so as to restrainingly engage the first locking gear, thereby to hold the backrest member against said pivotal movement.

2. A device according to claim 1, wherein the first locking gear is affixed to the gear means in concentric relation therewith, and wherein a second locking gear of smaller diameter than the first locking gear is concentrically affixed to the gear means for rotation therewith, and wherein the second locking pawl is pivotally mounted as aforesaid to restrainingly engage the second locking gear at its said first position and to be removed from said restraining engagement of the second locking gear upon movement to its said second position.

3. A device according to claim 2 wherein the first and second locking pawls are pivotally mounted on the first hinge bracket by means of a single pivot pin.

4. A device according to claim 3 wherein the first hinge bracket is integrally formed with the seat member.

5. A device according to claim 4, wherein a rotary handle means is drivingly connected to the gear means for activation thereof by an occupant of the vehicle seat assembly when the handle means is in its respective first position and the second locking pawl is in its respective second position.

* * * * *